(12) United States Patent
Giessler

(10) Patent No.: US 7,047,797 B2
(45) Date of Patent: May 23, 2006

(54) METHOD FOR DETECTING WEAR IN A BRAKE OR A CLUTCH

(75) Inventor: Folke Giessler, Neustadt (DE)

(73) Assignee: Siemens Aktiengesellschaft, Munich (DE)

( * ) Notice: Subject to any disclaimer, the term of this patent is extended or adjusted under 35 U.S.C. 154(b) by 556 days.

(21) Appl. No.: 10/255,990

(22) Filed: Sep. 26, 2002

(65) Prior Publication Data

US 2003/0061872 A1 Apr. 3, 2003

(30) Foreign Application Priority Data

Sep. 27, 2001 (DE) .......................... 101 47 817

(51) Int. Cl.
G01M 19/00 (2006.01)
G01R 27/26 (2006.01)

(52) U.S. Cl. ...................... 73/118.1; 324/660

(58) Field of Classification Search ................ 73/118.1, 73/488; 324/600, 649, 660–663, 654, 691, 324/699, 701, 713, 718, 207.11; 188/1.11; 303/118.1, 122.03, 3

See application file for complete search history.

(56) References Cited

U.S. PATENT DOCUMENTS

| | | | | |
|---|---|---|---|---|
| 3,271,737 A | * | 9/1966 | Bezemek | 340/454 |
| 3,833,103 A | * | 9/1974 | Stahle | 192/111 A |
| 3,975,706 A | * | 8/1976 | Kato | 340/52 A |
| 4,076,330 A | * | 2/1978 | Leiber | 303/92 |
| RE33,140 E | * | 1/1990 | Booth | 361/154 |
| 6,085,883 A | * | 7/2000 | Kimmig et al. | 192/70.25 |
| 6,257,374 B1 | * | 7/2001 | Strzelczyk et al. | 188/1.11 L |
| 6,282,954 B1 | * | 9/2001 | Ott et al. | 73/488 |
| 6,446,764 B1 | * | 9/2002 | Huang | 188/1.11 L |

FOREIGN PATENT DOCUMENTS

| | | |
|---|---|---|
| DE | 3739836 | 6/1989 |
| DE | 195 48 520 A1 | 6/1997 |
| DE | 19814042 | 7/1999 |

* cited by examiner

Primary Examiner—Edward Lefkowitz
Assistant Examiner—Octavia Davis
(74) Attorney, Agent, or Firm—Baker Botts L.L.P.

(57) ABSTRACT

The invention relates to a method for detecting wear in a frictionally locking clutch (50) or a frictionally locking brake (2, 40), the clutch (50) or the brake (2, 40) having at least one electrically excitable coil (4) and at least one element (20, 21, 23) which can move in rotation about an axis (3), to bring about frictional locking with at least one corresponding mating element (22, 28, 54), at least the element (20, 21, 23) which can move in rotation or the corresponding mating element (22, 54) being axially movable, and it being possible to form an airgap (26). The wear (46) can be inferred by virtue of the fact that the electric current is measured by the electrically excitable coil (4), evaluated and the evaluation compared with at least one reference value.

10 Claims, 5 Drawing Sheets

METHOD FOR DETECTING WEAR IN A BRAKE OR A CLUTCH

The invention relates to a method for detecting wear in a frictionally locking clutch or a frictionally locking brake.

BACKGROUND OF THE INVENTION

Clutches and brakes are known which use frictionally locking connections as a functional principle. These brakes and/or clutches have, for example, at least one electrically excitable coil, and at least one element which can move in rotation about an axis, to bring about frictional locking with a corresponding mating element. In this context, the element which can move in rotation or else the corresponding mating element can move axially. The clutch and brake respectively transmit forces and torques, the brake reducing the kinetic energy of at least one moving body by means of a frictionally locking connection to at least one nonmoving body, and the clutch coupling to one another, and decoupling, at least two movable bodies for their common movement.

Brakes may, for example, be permanent magnet brakes. In this context, the force of a permanent magnetic field is used to generate the braking effect. Permanent magnets generate a permanent magnetic field and attract at least one rotationally movable element to a corresponding mating element for frictionally locking connection. To cancel the braking effect, an electromagnetic field with an at least partially opposed field direction is superimposed on the permanent magnetic field so that the fields can at least partially cancel one another out. The electromagnetic field can be generated by means of an electrically excitable coil. It is also possible to establish connections with this mechanism between the permanent magnetic field and the electromagnetic field.

Brakes may also be spring-pressure brakes. In such brakes, the force of an electromagnetic field is used to cancel out the force, generated by a spring on an element which can move in rotation about an axis. The spring presses, an element which is moved at least in rotation toward a corresponding mating element to form a frictionally locking connection. In order to cancel the braking effect, an electromagnetic field which brings about a magnetic force, which is opposed to the force of the spring, is generated by means of an electrically excitable coil. Connections may also be established with this mechanism between the spring force and magnetic force.

Permanent magnetic brakes, spring pressure brakes and spring pressure clutches have an electrically excitable coil in order to effect a quiescent current, a working current brake or clutch depending on the design of the brake or clutch. The electrically excited coil exerts a force on preferably ferromagnetic material, which is at least part of at least one of the elements used in the frictional locking, and which is located at a variable distance from the electrically excitable coil.

The frictional locking between the element which moves in rotation about an axis and the corresponding mating element results in abrasion, i.e. wear on at least one of the elements involved in the frictional locking. The wear is a limiting factor on the service life of the brake or the clutch. Depending on the degree of wear, the function of the brake or of the clutch may no longer be sufficiently reliable and accordingly, at least a part of the brake or the clutch will have to be replaced.

Hitherto, the user of the brake or of the clutch has determined the extent of the wear. Since abrasion is characteristic of wear, it is possible to measure the abrasion mechanically from time to time by means of a length meter. This procedure is both cumbersome, time-consuming and costly. To avoid the necessity of measuring the abrasion, it would be necessary to replace the brake or the clutch periodical. A further possibility is to count the number of braking operations, emergency stop operations and clutch activation operations. After a fixed number of operations, critical wear would be assumed and the brake or the clutch would be replaced. In this procedure, a large number of brakes and clutches would be unnecessarily replaced thus incurring costs, outage times, material and work time since the actual amount of wear would warrant replacement. Moreover, when wear occurs, depending on the type of brake or clutch, it is not absolutely necessary to replace the entire brake or the entire clutch, but rather only the one worn part. Also it may be possible to readjust the brake or the clutch in order to compensate for the wear.

SUMMARY OF THE INVENTION

The present invention is intended to provide an improved, cost-effective method and device for detecting wear in a frictionally locking clutch, or in a frictionally locking brake. In the method for detecting wear in a frictionally locking clutch or in a frictionally locking brake, the electric current changes in the electrically excitable coil when the voltage across this coil is measured, and some of the measured values are evaluated by means of data processing equipment, and at least one result of the evaluation is compared with at least one stored value, with the wear being inferred from the comparison.

The clutch or the brake has at least one electrically excitable coil and at least one element which can move in rotation about an axis, to bring about frictional locking with at least one corresponding mating element. The element which can move in rotation or the corresponding mating element is axially movable, and at least one airgap between the movable element and the corresponding mating element changes when the clutch or the brake opens or closes.

The wear on friction surfaces, such as a brake lining, a brake disk and/or other elements involved in the frictional locking, is indicative of the wear of a frictionally locking clutch or a frictionally locking brake. This wear generally occurs in frictionally locking brakes or frictionally locking clutches with an electrically excitable coil in the region between an airgap of a magnetic circuit of the electrically excited coil, and influences it. As the wear increases, the airgap becomes larger and the inductance of the electrically excitable coil decreases. If the inductance decreases, the electrical time constant of the electrically excitable coil also decreases. The decrease in the inductance changes the profile of the electric current of the coil. Evaluations and/or criteria for this profile permit the wear to be inferred by means of a comparison with at least one stored set point value. The change in the time constant of the coil can also be used as a measurement variable for the detection of the wear. The smaller the inductance, the smaller the time constant.

In a preferred method for detecting wear in a frictionally locking clutch or a frictionally locking brake, the time of at least one peak of the electric current of the electrically excitable coil during the excitation process and/or during the de-excitation process of the electrically excitable coil is compared with a stored reference time and the wear is inferred from the difference between the times.

As the airgap becomes larger due to wear, for example the opening time or closing time of the brake becomes shorter, the inductance of the coil is reduced. This effect also occurs during clutch activation operations. In this way, the opening time or closing time can be used as a criterion for the wear. The reduction in the inductance can be detected when the voltage across the coil changes. Notches or peaks in the flow of current can be used as a criterion for the opening time or the closing time. These notches or peaks arise at the moment at which the elements which are provided for the frictional locking are released from one another and form an airgap, or else at the moment at which the elements which are provided for the frictional locking come into mutual contact and close the airgap. At these moments, the inductance of the coil changes to a very great extent owing to the airgap which is formed or which disappears, and has a decisive effect on the current flowing in the coil.

A notch which occurs in an otherwise continuously rising current profile, or a peak which occurs in an otherwise continuously falling current profile, can occur, for example, as a result of the evaluation of the differences of adjacent measured values, or by means of the evaluation of time derivatives of the current. The time when the notch or peak is determined is compared with a stored reference time. This reference time specifies, for example, the time of the notch or the peak in the current profile in a clutch or brake without wear. If a value between the time of the notch or the peak of the reference value, and the current time of the notch or the peak is exceeded, it is possible, for example, to generate a warning message. When the times are compared, a comparable starting time is specified in order to determine the time. This starting time is advantageously the voltage jump when the exciter voltage is applied to the coil or the voltage jump when the exciter voltage is switched off.

In a further preferred embodiment method for detecting wear in a frictionally locking clutch or a frictionally locking brake, a superimposed alternating voltage is applied to the electrically excitable coil, which alternating voltage leaves the operating state of the clutch or of the brake unchanged. The complex resistance and/or the virtual component of the complex resistance from this superimposed alternating voltage is measured together with the measured current, compared with a reference value, and the wear is inferred therefrom, with a smaller virtual component being set when the wear increases.

The inductance of the electrically excitable coil, or of the impedance associated with it, also referred to as complex resistance, is measured by superimposing an alternating current on a supply voltage of the coil. The complex resistance is determined from the measured alternating current and from the measured or known impressed alternating voltage, given knowledge of the ohmic resistance of the coil. The ohmic resistance is determined, for example, from the d.c. component of the electrical current voltage. If both measurements, the measurement of the ohmic resistance, i.e. of the real part of the complex resistance, and the measurement of the virtual part of the complex resistance or of the impedance, are carried out approximately simultaneously, the temperature influence on the ohmic resistance is thus also taken into account. If the inductance, which can be determined from the measurements, or another comparable value such as the complex resistance, drops below a certain limiting value which is stored as a reference value, it means that the wear has progressed to such a point that a warning about the wear is triggered. The measurement is advantageously carried out when an airgap is present as the change in the inductance is marked in particular in the operating state with an airgap. Evaluation circuits for complex alternating variables are well known to those skilled in the art. If rectifiers are provided as a voltage source for exciting the coil, they often already have an alternating component. This alternating component of, for example, 100 Hz is advantageously used as a superimposed alternating voltage.

If a binary signal is required for the detection of wear, a more precise detection can be implemented with the foregoing methods by comparing the measured values, or values from the evaluation of the measured values, for example the complex resistance or the time of the current notch, with different stored reference values. The reference values are each assigned a value which represents a degree of wear so that the wear may be determined. If the change in the wear is recorded, this can be used as a basis for further diagnostics.

The following is an example of an equation for calculating an alternating component in the case of complex resistances:

$$Z = \frac{U}{I} = \sqrt{R^2 + (\omega L)^2}, \text{ where } \omega = 2\pi f$$

In principle, the calculation of alternating variables is concerned with complex variables, Z is an absolute value of a complex resistance, U represents a voltage, I is current, R is real resistance, f is frequency, and L is inductance.

A device for carrying out the method for detecting wear in a frictionally locking clutch or a frictionally locking brake is also part of the present invention. The clutch or the brake has at least one coil which can be electrically excited by means of at least one voltage source, and at least one element which can move in rotation about an axis, to bring about frictional locking with a corresponding mating element, with the element which can move in rotation, or the corresponding mating element being axially movable, and a means for measuring the electric current of the electrically excitable coil, and a means for evaluating the measurement of the electric coil. In this device, the inclusion of the electric current of the excitable coil in the detection of wear is advantageous since the excitable coil is already a feature of the brake or of the clutch. An additional inductive means for generating an electrical magnetic field to determine the wear is unnecessary, which results in cost savings. The electrically excitable coil is preferably fixed with respect to a generating means, such as a voltage source. This allows sliding contacts to be avoided.

While means for measuring the electric current include commercially available current measuring devices which are connected into the circuit, clip-on ammeters have the advantage that they can easily be used in already existing brakes or clutches without having to disconnect the circuit of the electrically excitable coil. A further possible way of measuring the current is to measure the voltage by means of a resistor which is part of the circuit of the electrically excitable coil.

A means for evaluating the electric current is an electrical circuit or a data processing means which evaluates the measurement results of at least the measurement of the current. Already existing data processing means, for example a numerical controller, a computer for the numerical controller, an electronic part of a rectifier or a stored-program controller are advantageously and cost-effectively used for the data processing. The device for detecting wear can be used in spring pressure brakes, permanent magnetic brakes or multi-disk clutches having an electrically excitable coil. Frictionally locking clutches and brakes can synchronize two machine parts which rotate at different rotational speeds. They perform shift work in the process. If, for safety reasons, quiescent-current-actuated brakes or clutches which have to perform shifting work are required, it is possible, for example, to use multi-disk spring pressure brakes and spring pressure clutches.

In a preferred embodiment of the device for detecting wear in a frictionally locking clutch or a frictionally locking brake, at least one element which is involved in the frictional locking comprises ferromagnetic material. Parts which are affected by the wear, such as a friction surface are preferably located in the region of the airgap of a magnetic circuit which is influenced by the excitable coil. This magnetic circuit is then influenced in the region of the airgap in particular if the parts which are subjected to wear have a ferromagnetic material. The greater the change in the inductance of the coil when wear occurs, the simpler the determination of the wear.

In another preferred embodiment of the device for detecting wear in a frictionally locking clutch or a frictionally locking brake, the electrically excitable coil is excited at least by means of a voltage jump or by means of an alternating voltage. A changing electrical current through the coil is necessary to determine wear. A change in current occurs when there is a change in the voltage applied to the coil. Such a change in voltage is, for example, a voltage jump. In brakes or in clutches having coils excited by means of a d.c. voltage, a voltage jump occurs when d.c. voltage is applied, or is disconnected in order to change the operating state. Brakes are either opened or closed. Different braking forces are differentiated under certain circumstances. Clutches have a decoupled state and a coupled state as operating states. In brakes, the brake opens, for example when the d.c. voltage is applied to the coil or to the terminals of the coil. When the coil is disconnected from the d.c. voltage, the brake closes. When the brake is opened and closed, the element for frictional locking, which can move in rotation about an axis and which is usually a disk is advantageously moved axially toward or away from a mating element. An already existing voltage source for exciting the coil is advantageously used to generate the change in voltage. As a result, no additional means is necessary for this, which reduces the costs for the detection of wear.

In another preferred embodiment of the device for detecting wear in a frictionally locking clutch or a frictionally locking brake, a measuring means determines information relating to the chronological axial movement profile of at least the element which can move in rotation about an axis, or of the corresponding mating element. The means for evaluating the chronological axial movement profile infers the wear. The inference of the wear is made by means of the comparison with reference values. During the movement process or during the coupling process, the inductance of the coil changes in a jump-like fashion when the elements just begin to touch and when the elements disconnect from one another. The sudden change in the inductance is manifested in a sudden change in the electrical current through the coil. The smaller the inductance, the sooner the jump-like change in the current occurs when there is a voltage jump in order to change the operating state of the brake or of the clutch. Thus, for example, the opening time of the brake becomes shorter as the airgap becomes bigger, and can thus be used as a criterion for the wear of the brake lining or elements which are involved in the frictional locking.

In a further preferred embodiment of the device for detecting wear in a frictionally locking clutch or a frictionally locking brake, a superimposed alternating voltage is applied to the electrically excitable coil, a measuring means to determine information relating to the profile of the electrical current of the electrically excitable coil and at least one means for determining a value which is dependent on at least the virtual component of the complex resistance of the coil is provided. From the foregoing it is possible to compare this value with at least one reference value.

Alternatively, or in addition, in order to determine the wear over the opening times and/or closing times, the change in the inductance of the coil itself can also be provided for determining the wear. An alternating voltage is superimposed on the coil voltage. This alternating voltage is generated, for example, by means of a separate alternating voltage source, or by using an alternating voltage component of an already existing d.c. voltage source, which is provided for exciting the coil. The superimposed alternating voltage leaves the operating state of the clutch or of the brake unchanged, as the amplitude and frequency are appropriately selected. Given knowledge of the fed-in voltage and/or after measurement of the voltage across the coil and after measurement of the electrical current through the coil, the wear can be determined using the evaluation means.

In a coil which is excited by a d.c. voltage, the time constant of the inductance of the coil can be determined by means of a renewed voltage jump with the same polarity. When a coil is not excited, the time constant can also be determined by exciting the coil with the polarity which is opposed to that for operation.

In a further preferred embodiment of the present invention, a means for detecting electrical voltage across the electrically excitable coil is provided. Such a means may be a volt meter, which is necessary in particular if the profile of the superimposed alternating voltage is unknown. The device for detecting wear is advantageously used in a holding brake of an electrical machine. Holding brakes are safety-related components of drives or of electric motors, for example in robot applications. The failure of a brake can put persons and objects at extreme risk. Brakes such as holding brakes have a limited service life, which is determined in particular by the wear of the brake lining and/or other friction surfaces. This depends, for example, on the number of emergency stops, on the rotational speed at which braking occurs, and with which overall moment of inertia braking is carried out. With the device according to the present invention the requirement, for example, of summing the number of emergency stops and issuing a warning and/or an alarm when a maximum permitted number is reached is no longer necessary. The detection of wear according to the invention is a direct method for monitoring the brake or the holding brake, and the shortcomings of an indirect method, such as the summing of the number of braking operations, can be eliminated.

The device of the present invention for detecting wear is advantageously used in a holding brake of an electrical machine, the electrical machine having at least one data communication device. If the electrical machine has a data communication device, this is also used to transmit data and/or signals such as measurement variables to an evaluation means. If the electrical machine itself has the evaluation means, and is thus an intelligent electrical machine, at least one signal which indicates the wear, for example a warning signal, can be transmitted.

BRIEF DESCRIPTION OF THE DRAWINGS

The invention is further disclosed herein below in connection with the drawings in which examples of a brake and of a clutch as well as diagrams illustrating the method for detecting wear and a schematic illustration of the invention for detecting wear are shown. In the drawing.

Elements of the same type are provided with identical reference symbols in the following FIGS. 1 to 6.

DETAILED DESCRIPTION OF THE INVENTION

Figure 1:
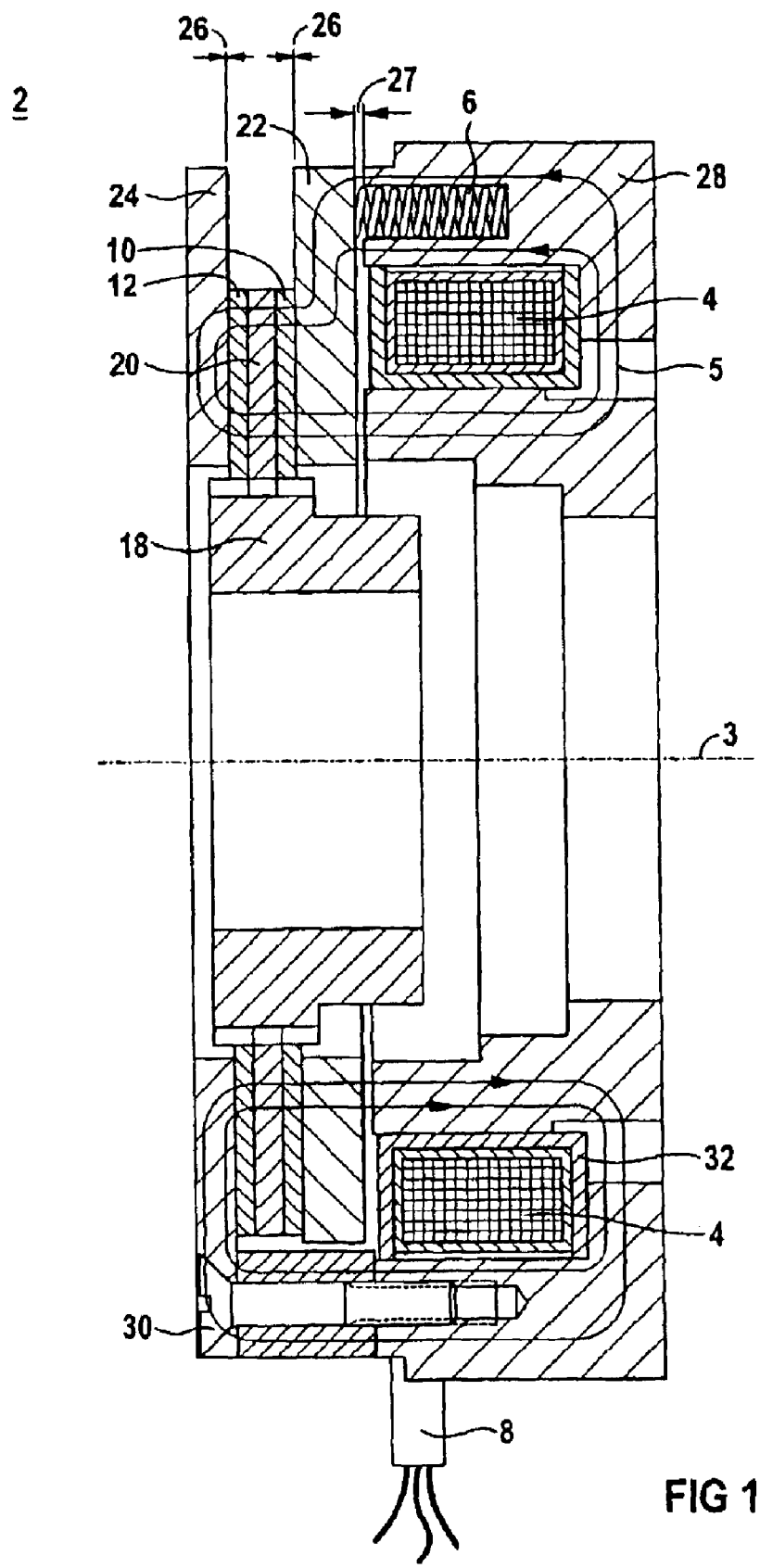
FIG. 1 illustrates a spring pressure brake.

FIG. 1 shows a spring pressure brake 2. It has a fixed element such as an armature 22 and at least one element which can move in rotation about an axis 3, here a driver 18 and a friction disk 20. The armature 22 is connected via a spring 6 to a magnet housing 28. Within the magnet housing there is an electrically excitable coil 4 in a coil housing 32. The coil 4 can be excited by means of a coil terminal 8 so that a magnetic field is formed in the excited state. A magnet flux 5 is represented by lines. Between the armature 22 and the magnet housing 28 is an airgap 27. This airgap 27 occurs when the spring 6 presses the armature 22 against the friction disk 20, the friction disk 20 having a brake lining 10 and 12. The brake lining 10 is then located in a frictionally locking connection with the armature 22, whereas the brake lining 12 is in a frictionally locking connection with the friction plate 24, which is also fixed like the armature 22. If the brake is opened, an airgap 26 is thus also formed between the brake linings 10 and 12 and the corresponding friction surfaces of the armature 22 and of the friction plate 24. As a result of wear, the brake linings 10 and 12 which are located on the friction disk 20 which is connected to the driver 18 become progressively narrower and the airgaps 26, 27 become progressively larger. The friction plate 24 is connected to the magnet housing 28 via a friction plate attachment 30. When the coil is excited via the magnetic housing, the magnetic flux 5 extends to the airgap 26, the armature 22, the brake linings 10 and 12, the airgaps 26 and the friction disk 20 and the friction plate 24, and back to the magnet housing 28. As a result of the excitation of the coil 4, the armature 22 is attracted to the magnet housing 28 so that the friction disk 20 with the brake linings 10 and 12 is released for movement so that the driver 18 can move freely in rotation about the axis 3. The electrically excited coil 4 therefore cancels the spring force of the spring 6 in the opened state of the brake, or counteracts it. As a result of wear, at least one airgap 26, 27 becomes larger so that the inductance of the coil 4 changes.

Figure 2:
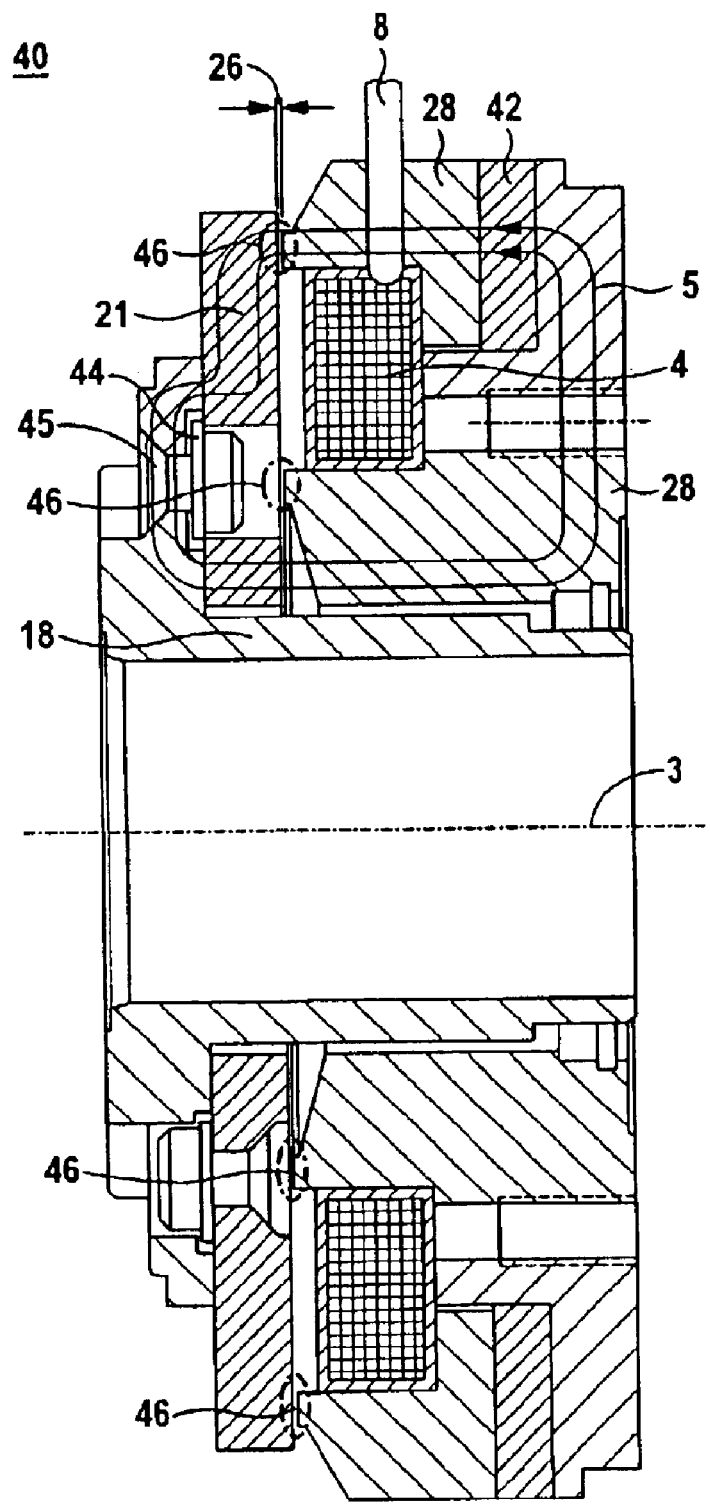
FIG. 2 illustrates a permanent magnet brake.

FIG. 2 shows a permanent magnetic brake 40. The function of the brake 6 in FIG. 1 is performed by a permanent magnet 42 in FIG. 2. Permanent magnet 42 is located on a magnet housing 28 which also holds an electrically excitable coil 4. The electrically excitable coil 4 can be excited by means of the coil terminal 8. The magnet housing 28 is bounded by an armature 21 which is connected to the driver 18 via at least one leaf spring 44 and at least one rivet 45. In contrast to FIG. 1, the armature 21 in FIG. 2 can be entrained in rotation about the axis 3 together with the driver 18. In such a permanent magnet brake, the force effect of the magnetic field which is generated by the permanent magnet 42 is used to generate a braking torque. In order to cancel the braking effect, i.e. to open the permanent magnet brake 40, the magnetic field of the permanent magnet 42 is counteracted by the electromagnetic field when the coil 4 is excited. As a result of a braking process, wear occurs both at the magnet housing 28 and at the armature 21 in the wear region 46. As a result of this wear, the airgap 26 becomes larger so that the inductance of the coil 4 changes, and thus the current profile also changes in the event of the coil 4 being fed with a changing voltage.

Figure 3:
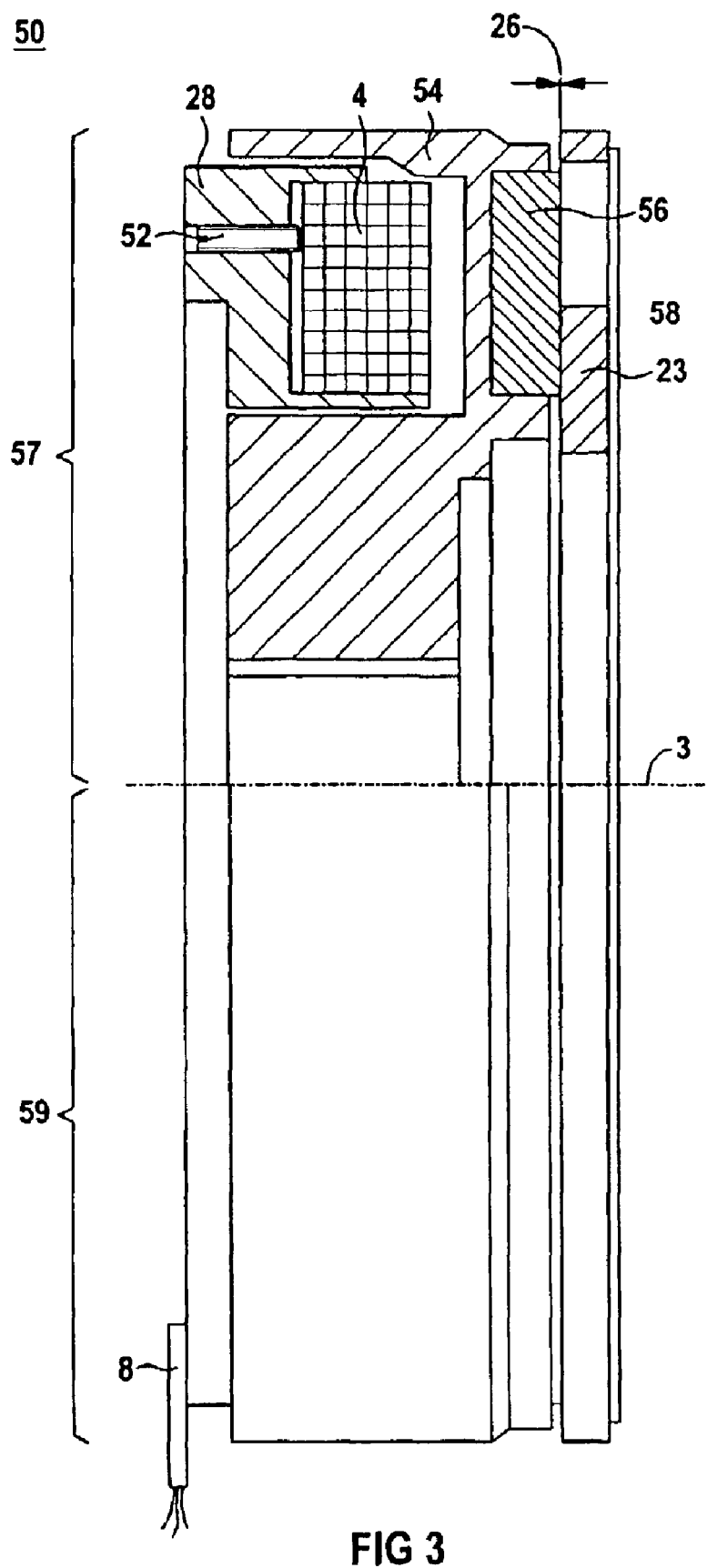
FIG. 3 illustrates an electromagnet single-surface clutch.

FIG. 3 shows a clutch 50 in a coupled operating state in a view 59, and a section 57. Like the brakes 2, 40, the clutch 50 also has a coil 4 within a magnet housing 28, the coil being locked within the magnet housing 28 by means of a locking means 52. A magnet element 54 moves in rotation about the axis 3 and has a frictional lining 56. When the clutch 50 is in the coupled state the frictional lining 56 is in frictionally locking contact with an armature 23. In the uncoupled state, an airgap 26 is produced between the frictional lining 56 and the armature 23. The fixed magnetic housing 28 is permanently connected to a fixed part, for example an electrical machine. The magnet element 54 is, for example, fixed in terms of rotation to the axis 3 by means of a shaft (not illustrated). The frictional lining 56 located at the end of the magnet element 54 closes as a result of the contact with the armature 23. When the coil 4 is excited, the armature 23 is pressed against the friction lining 56 by the magnetic field which is generated, and is entrained in a frictionally locking fashion by the magnet element 54 as the armature 23 can also move in rotation about the axis 3. Here too, as described above with the brakes 4, a change in the size of the airgap 26 occurs as a result of wear so that it is possible to infer the wear from the profile of the current of the coil 4.

Figure 4:
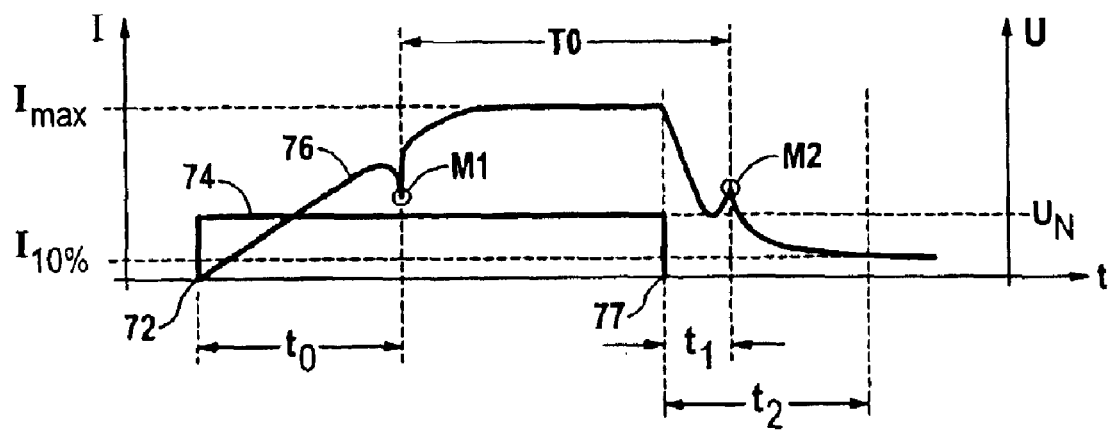
FIG. 4 illustrates an electrical current profile when a brake opens and closes.

FIG. 4 shows a diagram 14 with a T axis on which a time t is to be entered, an I axis on which a current I is to be entered, and a U axis on which a voltage U is to be entered. The U axis and the I axis are perpendicular to the T axis. In the diagram 14, both the current I through a coil 4 (known for example from FIG. 2) of a brake, and the voltage U across the coil 4 are plotted. At a time which is designated as the start of excitation 72, a rated voltage $U_N$ is applied to the coil 4. In the excited state of the coil 4 the brake is assumed to be open. The profile of the current U across the coil 4 is apparent from a voltage curve 74. With the start of excitation 72, the current I of the coil 4 rises. This is apparent from a current curve 76. After the time period $t_o$, a voltage notch M1 is apparent. At this time, the airgap 26 occurs. In the time period $T_o$, the brake is opened. At the time of the end of excitation 77, the voltage U drops back from $U_N$ to zero. This results in a reduction in the coil current I. The current peak M2 characterizes here the time at which the brake closes again and the airgap 26 disappears. The current peak indicates the time of contact between the elements which build up the frictional engagement. If the inductance of the coil 4 changes due to wear, the current notch M1 and the current peak M2 are shifted chronologically. It is possible to draw conclusions about the wear from a comparison between the actual time of the current notch M1 or of the current peak M2 with at least one reference time. By way of example it is possible to use both the voltage curve 74 and the current curve 76 with a threshold current value $I_{10\%}$ (for example 10% of a maximum current $I_{max}$) as a starting point for counting time. The incrementation of the time during the measurement of current I and voltage U can be implemented by, for example, a timing counter or else by means of sampling frequency of the measurement. The sampling frequency should be selected with such a magnitude that the voltage notch M1 or else the current peak M2 are apparent.

Figure 5:
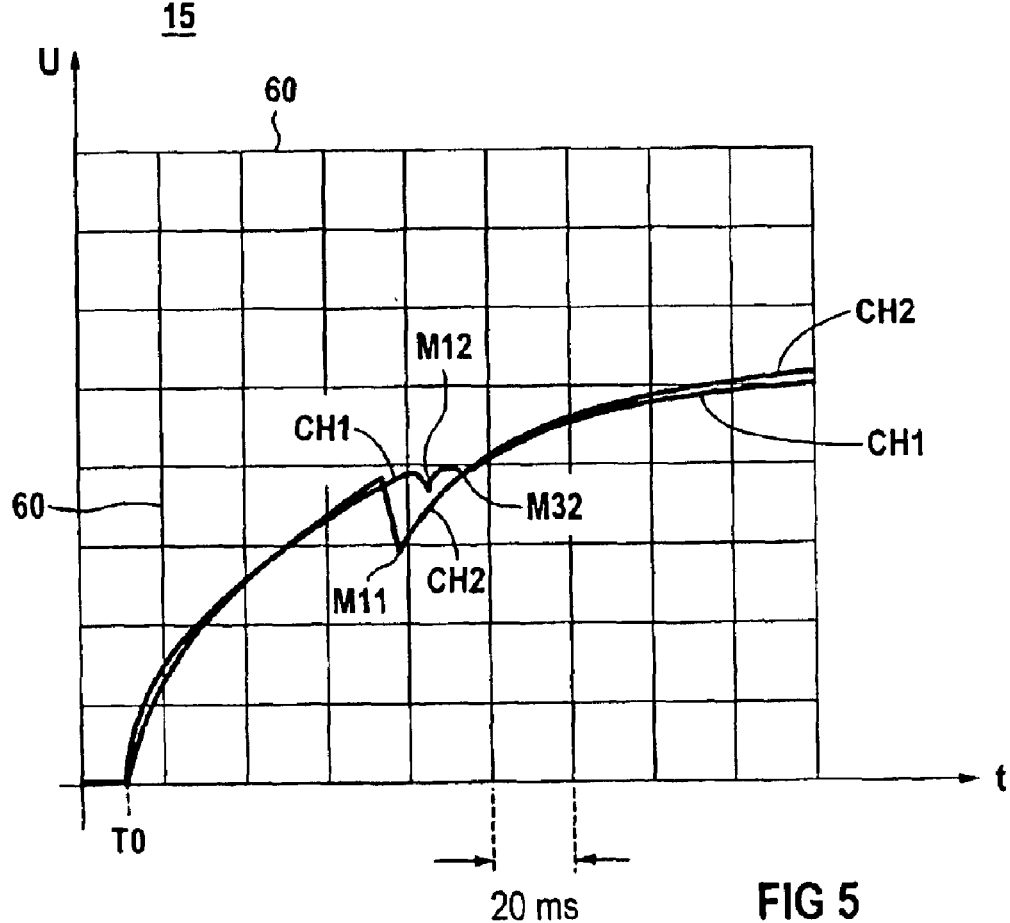
FIG. 5 illustrates a current profile of a brake which has been subjected to wear in comparison with a nonworn brake.

FIG. 5 shows a diagram with a time axis t and a U axis, with a channel CH1 and CH2 represented in a grid 60. FIG.

5 is based on a representation on an oscillograph, the current profile of a brake without wear being based on a channel CH1, and the current profile of a brake with wear being shown on channel CH2. The current profile is assumed to be proportional to a voltage, and is thus plotted against the voltage U. A current notch M11 characterizes, for channel CH2, the time at which an airgap occurs. It is apparent here that the current notch M11 occurs chronologically before a current notch M12 of the channel CH1. The wear of the brake which is represented in the current profile in channel CH2 is greater than the wear of the brake, the current profile of which is represented in channel CH1. The signal profile in the channel CH1 shows two current notches M12 and M32 which result from the fact that, for example during the formation of the airgap, initially a first region of an armature 21 is released from the magnet element 28 and only afterwards is the entire armature 21 released so that a sort of hinged effect is produced. If the airgap 26 occurs simultaneously in all the regions, only one current notch M11 is produced, as illustrated in channel CH2.

Figure 6:
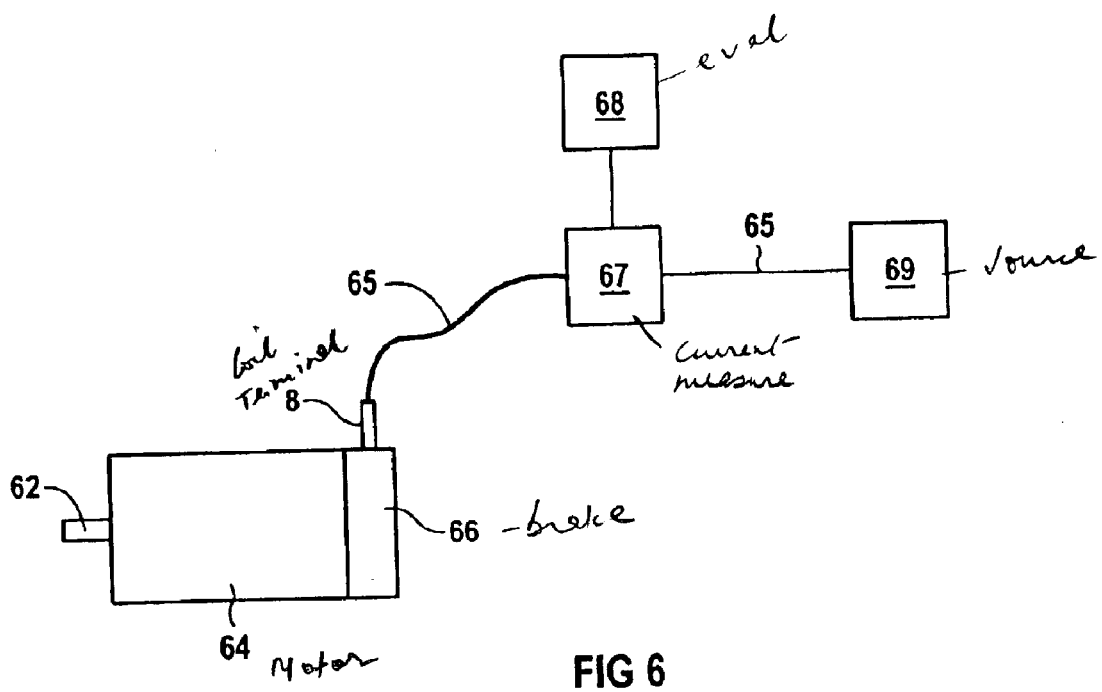
FIG. 6 illustrates a schematic view of a design of a device for detecting wear.

FIG. 6 shows a brake 66 for braking an electric motor 64, a shaft 62 of which is also illustrated. The brake 66 is supplied with a feed voltage via the coil terminal 8. A cable 65 leads from the coil terminal 8 to a means 67 for measuring the coil current. The coil current is evaluated using an evaluation means 68. The brake 66 is supplied with a voltage by means of the exciter source 69 to which the cable 65 extends onward.

I claim:

1. A method for detecting wear in a frictionally locking clutch or brake, the clutch or brake having at least one electrically excitable coil through which an electric current passes, at least one element to effect frictional locking with at least one mating element, the element or the mating element being axially movable and having at least one airgap between the element and the mating element when the clutch or the brake is open, comprising changing said airgap when the clutch or the brake opens or closes, measuring the electric current through the electrically excitable coil when a voltage across the coil changes, evaluating at least some measured values by means of data processing equipment, comparing a time at which at least one notch or one peak of the electric current during an excitation process and/or during a de-excitation process of the electrically excitable coil with a stored reference time, and inferring the wear from the difference between the times.

2. The method for detecting wear according to claim 1, further comprising applying a superimposed alternating voltage to the electrically excitable coil, which alternating voltage leaves an operational state of the clutch or of the brake unchanged, and measuring a complex resistance and/or virtual component of the complex resistance from the superimposed alternating voltage together with a measured current, said virtual component being compared with a reference value, and inferring the wear therefrom, wherein a smaller virtual component is set when the wear increases.

3. A device for detecting wear in a frictionally locking clutch or a frictionally locking brake wherein the clutch or the brake comprises at least one coil which can be electrically excited by means of at least one voltage source, and at least one element which can move in rotation about an axis, to effect frictional locking with a corresponding mating element, there being at least one air gap between said element and said corresponding mating element when the clutch or the brake is open, said element which can move in rotation or the corresponding mating element being axially movable, a means for measuring the electric current of the electrically excitable coil and a means for comparing a time at which at least one notch or one peak of the electric current during an excitation process and/or during a de-excitation process of the electrically excitable coil with a stored reference time, and inferring the wear from the difference between the times.

4. The device according to claim 3, wherein at least one element for effecting the frictional locking comprises a ferromagnetic material.

5. The device according to claim 3, wherein the electrically excitable coil is excited by means of a voltage jump or by means of an alternating voltage.

6. The device according to claim 3, wherein the measuring means can determine information relating to a profile of chronological axial movement of at least the element which can move in rotation about an axis, or of the corresponding mating element, and the means for evaluating the chronological axial movement profile infers the wear.

7. The device according to claim 3, wherein a superimposed alternating voltage can be applied to the electrically excitable coil, a measuring means can determine information relating to a profile of the electrical current of the electrically excitable coil, and wherein the means for determining a value is dependent on at least a virtual component of a complex resistance of the coil, and said value being compared with at least one reference value.

8. The device according to claim 7, further comprising a means for measuring the voltage across the electrically excitable coil.

9. The device according to claim 3, wherein the brake is a holding brake in an electrical machine.

10. The device according to claim 9, further comprising at least one data communication device associated with the electrical machine.

* * * * *